(12) United States Patent
Welles

(10) Patent No.: US 9,938,177 B2
(45) Date of Patent: Apr. 10, 2018

(54) METHODS AND APPARATUS FOR PRODUCING A GLASS RIBBON

(71) Applicant: Corning Incorporated, Corning, NY (US)

(72) Inventor: Andrew Voss Welles, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/893,820

(22) PCT Filed: May 27, 2014

(86) PCT No.: PCT/US2014/039493
§ 371 (c)(1),
(2) Date: Nov. 24, 2015

(87) PCT Pub. No.: WO2014/193780
PCT Pub. Date: Dec. 4, 2014

(65) Prior Publication Data
US 2016/0107916 A1 Apr. 21, 2016

Related U.S. Application Data

(60) Provisional application No. 61/829,566, filed on May 31, 2013.

(51) Int. Cl.
*C03B 17/06* (2006.01)
(52) U.S. Cl.
CPC .......... *C03B 17/067* (2013.01); *C03B 17/064* (2013.01)

(58) Field of Classification Search
CPC .............................. C03B 17/064; C03B 17/067
See application file for complete search history.

(56) References Cited

U.S. PATENT DOCUMENTS

| | | | |
|---|---|---|---|
| 2,928,212 A | 3/1960 | Long |
| 3,256,082 A | 6/1966 | Ward |
| 3,682,609 A | 8/1972 | Dockerty |
| 3,775,080 A | 11/1973 | Brichard |
| 3,801,411 A | 4/1974 | Brichard |
| 4,197,106 A | 4/1980 | Trevorrow et al. |
| 4,983,203 A | 1/1991 | Erb et al. |
| 5,459,943 A | 10/1995 | Tanahashi |
| 7,818,980 B2 | 10/2010 | Burdette et al. |

(Continued)

FOREIGN PATENT DOCUMENTS

| CN | 202214288 U | 5/2012 |
|---|---|---|
| GB | 786399 A | 11/1957 |

(Continued)

OTHER PUBLICATIONS

English Translation of TW103118113 Search Report dated Sep. 14, 2017, Taiwan Patent Office.

*Primary Examiner* — Jodi C Franklin

(57) ABSTRACT

Apparatus for producing a glass ribbon includes a convection cooling device including at least one vacuum source configured to promote convection cooling of the glass ribbon by forcing a cooling fluid to flow along the glass ribbon. In further examples, methods of producing glass ribbon include the step of creating a vacuum to promote convection cooling of the glass ribbon by forcing a cooling fluid to flow along the glass ribbon.

16 Claims, 6 Drawing Sheets

(56) References Cited

U.S. PATENT DOCUMENTS

| | | |
|---|---|---|
| 8,037,716 B2 | 10/2011 | Aniolek et al. |
| 8,297,078 B2 | 10/2012 | Moon et al. |
| 8,365,556 B2 | 2/2013 | Pitbladdo |
| 2009/0100873 A1 | 4/2009 | Allan et al. |
| 2011/0126591 A1* | 6/2011 | Chalk .................. C03B 17/067 65/84 |
| 2011/0289967 A1 | 12/2011 | Burdette |
| 2012/0318020 A1 | 12/2012 | Delia et al. |
| 2013/0133368 A1* | 5/2013 | Fournel ................ C03B 17/067 65/53 |
| 2016/0107916 A1* | 4/2016 | Welles ................. C03B 17/067 65/53 |

FOREIGN PATENT DOCUMENTS

| | | |
|---|---|---|
| GB | 1354006 A | 6/1974 |
| WO | 2010141832 A1 | 12/2010 |

\* cited by examiner

METHODS AND APPARATUS FOR PRODUCING A GLASS RIBBON

CROSS-REFERENCE TO RELATED APPLICATIONS

This application claims the benefit of priority of U.S. Application Ser. No. 61/829,566 filed on May 31, 2013 the content of which is relied upon and incorporated herein by reference in its entirety.

FIELD

The present disclosure relates generally to apparatus and methods for producing glass ribbon and, more particularly, to apparatus and methods for producing a glass ribbon with at least one vacuum source configured to promote convection cooling of the glass ribbon by forcing a cooling fluid to flow along the glass ribbon.

BACKGROUND

It is known to draw a glass ribbon with a draw device. The glass ribbon may be subsequently divided to produce a plurality of glass sheets that may be employed in a wide range of applications. The glass ribbon is known to be drawn in a viscous state for eventual cooling into an elastic state where final features are permanently set into the glass sheet.

Known methods exist to cool a sheet of glass by radiation heat transfer. For example, GB1354006 involves a radiation system that is designed to provide cooling without inducing convection currents that expose the glass sheet to cooling air or other gases. Rather, GB1354006 provides a system that cools by radiation being transferred from the glass sheet to the wall member wherein heat is removed from the wall member by passing of a controlled high velocity stream of air across the back surface of the wall member. Radiation cooling, however, may not be as effective downstream and/or with glass that is being drawn at lower temperatures.

SUMMARY

The following presents a simplified summary of the disclosure in order to provide a basic understanding of some example aspects described in the detailed description.

Example apparatus and methods of the present disclosure provide convection heat transfer by producing convection currents that expose the glass sheet to cooling air or other gases to promote convection cooling of the glass ribbon. The convection currents are produced by using a vacuum source to cause a cooling fluid to flow along the glass ribbon. Such convection cooling systems can provide effective cooling at locations downstream from the drawing device and/or with glass that is being drawn at lower temperatures.

In a first aspect of the disclosure, a method of producing a glass ribbon includes the step (I) of drawing a glass ribbon along a draw direction into a viscous zone, wherein the glass ribbon includes opposed edges and a lateral portion extending between the opposed edges along a lateral direction transverse to the draw direction. The method further includes the step (II) of drawing the glass ribbon into a setting zone downstream from the viscous zone, wherein the glass ribbon is set from a viscous state to an elastic state. The method further includes the step (III) of drawing the glass ribbon into an elastic zone downstream from the setting zone. The method also includes the step (IV) of creating a vacuum to promote convection cooling of the glass ribbon by forcing a cooling fluid to flow along the glass ribbon.

In one example of the first aspect, step (IV) includes contacting the glass ribbon with the cooling fluid.

In another example of the first aspect, the vacuum of step (IV) forces the cooling fluid to flow in a flow direction that is substantially opposite to the draw direction.

In a further example of the first aspect, the vacuum of step (IV) forces the cooling fluid to flow in a flow direction that has a vector component that is opposite to the direction of gravity.

In yet another example of the first aspect, step (IV) includes providing a first vacuum source associated with a first major surface of the glass ribbon and a second vacuum source associated with a second major surface of the glass ribbon. For example, step (IV) can operate the first vacuum source independently from the second vacuum source.

In another example of the first aspect, step (IV) includes adjusting a cooling profile along the lateral portion of the glass ribbon with a plurality of vacuum ports disposed along the lateral direction.

In a further example of the first aspect, step (IV) only promotes substantial convection cooling in the elastic zone.

In yet a further example of the first aspect, step (IV) only promotes substantial convection cooling in the elastic zone and the setting zone.

In still another example of the first aspect, step (I) comprises fusion drawing the glass ribbon from a root of a forming wedge into the viscous zone.

The first aspect of the disclosure can be carried out alone or together with one or any combination of examples of the first aspect discussed above.

In a second aspect of the disclosure, an apparatus for producing a glass ribbon comprises a drawing device configured to draw molten glass into a glass ribbon in a draw direction along a draw plane of the apparatus. The apparatus further includes a convection cooling device including at least one vacuum source configured to promote convection cooling of the glass ribbon by forcing a cooling fluid to flow along the glass ribbon.

In one example of the second aspect, the convection cooling device is configured to promote contacting of the glass ribbon with the cooling fluid.

In another example of the second aspect, the convection cooling device is configured to force the cooling fluid to flow in a flow direction that is substantially opposite to the draw direction.

In still another example of the second aspect, the at least one vacuum source comprises a first vacuum source configured to be associated with a first major surface of the glass ribbon and a second vacuum source configured to be associated with a second major surface of the glass ribbon. For example, the convection cooling device can be configured to operate the first vacuum source independently from the second vacuum source.

In another example of the second aspect, the convection cooling device includes a plurality of vacuum ports disposed along a lateral portion of the glass ribbon. For example, each of the plurality of vacuum ports can include an adjustable flow control device configured to adjust fluid flow through the corresponding vacuum port.

In a further example of the second aspect, the convection cooling device includes at least one vacuum port that is adjustable to control fluid flow through the corresponding vacuum port.

In still a further example of the second aspect, the drawing device is configured to draw the molten glass from a viscous zone into a setting zone downstream from the viscous zone, wherein the glass ribbon is set from a viscous state to an elastic state, and then from the setting zone to an elastic zone downstream from the setting zone, wherein the convection cooling device includes at least one vacuum port positioned downstream from the viscous zone.

In still a further example of the second aspect, the drawing device includes a forming wedge with a root, wherein the drawing device is configured to draw a glass ribbon off the root of the forming wedge.

The second aspect of the disclosure can be carried out alone or together with one or any combination of examples of the second aspect discussed above.

BRIEF DESCRIPTION OF THE DRAWINGS

These and other features, aspects and advantages of the claimed invention are better understood when the following detailed description is read with reference to the accompanying drawings, in which:

DETAILED DESCRIPTION

Figure 1:
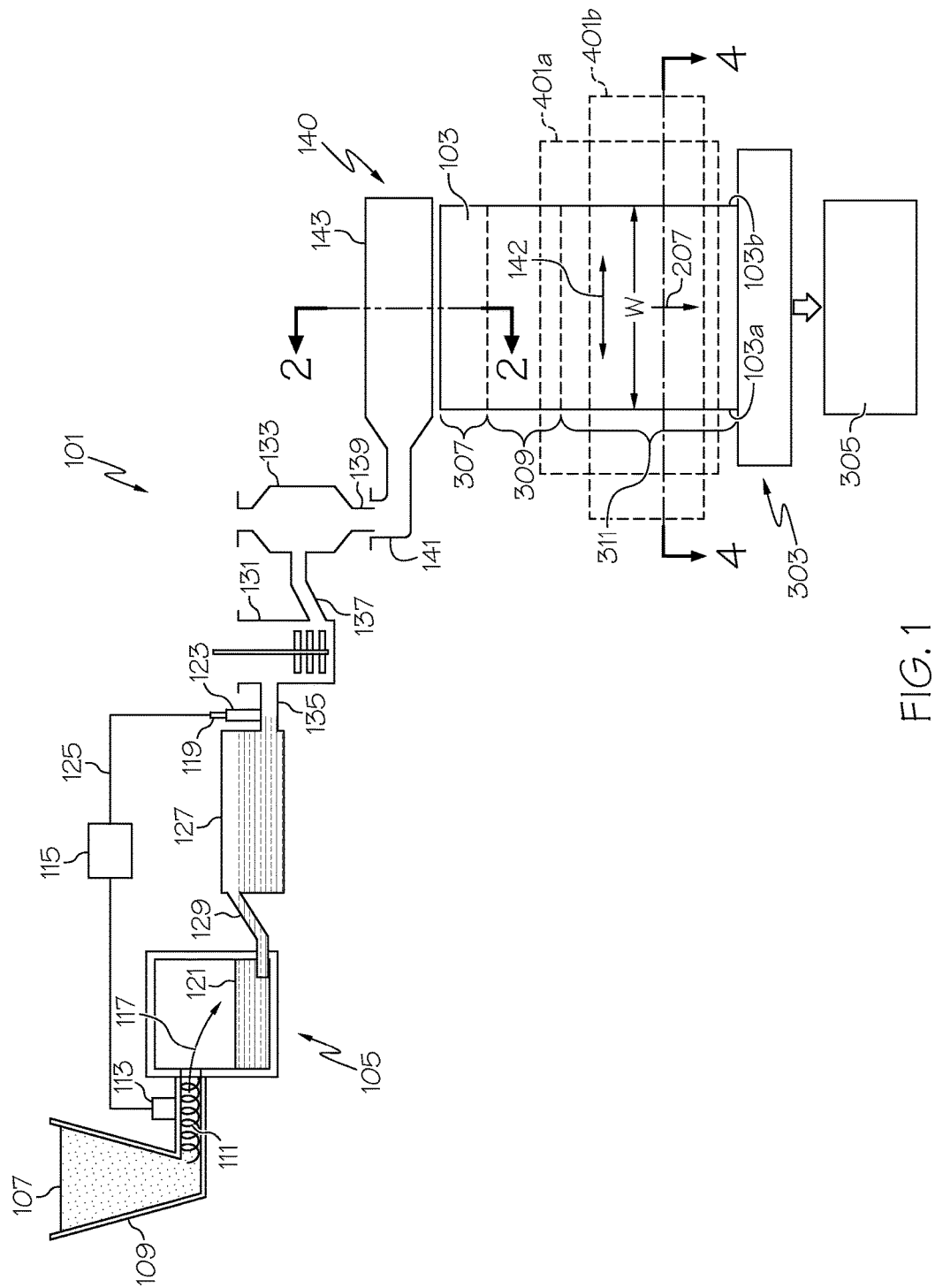
FIG. 1 is a schematic illustration of an example an apparatus for producing glass ribbon in accordance with aspects of the disclosure.

Aspects of the claimed invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Apparatus can be provided to form a glass ribbon for subsequent processing into glass sheets. FIG. 1 schematically illustrates the apparatus in the form of a fusion draw apparatus 101 although down-draw, up-draw, slot draw, float, or other glass forming techniques may be used with aspects of the disclosure in further examples. With such glass ribbon forming techniques, the present disclosure provides for control of viscosity and temperature cooling curves to provide process stability and facilitate quality performance. For instance, in the illustrated fusion draw apparatus 101, proper cooling below a forming vessel can help provide the glass ribbon with sufficient cooling and high-enough viscosity to minimize ribbon bagginess, i.e., the tendency of the ribbon to deform uncontrollably, such as unevenly under its own weight. Proper cooling below the forming vessel can also help stabilize thickness and provide shape control. Furthermore, proper cooling can help provide appropriate transitioning and conditioning of the glass into the visco-elastic region where final glass flatness, stress, and shape is controlled.

FIG. 1 illustrates a fusion draw apparatus 101 as just one example of an apparatus for producing a glass ribbon in accordance with aspects of the disclosure. The fusion draw apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A metal probe 119 can be used to measure a glass melt 121 level within a standpipe 123 and communicate the measured information to the controller 115 by way of a communication line 125.

The fusion draw apparatus 101 can also include a fining vessel 127, such as a fining tube, located downstream from the melting vessel 105 and coupled to the melting vessel 105 by way of a first connecting tube 129. A mixing vessel 131 such as a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver glass melt 121 from the delivery vessel 133 to a drawing device 140. In the example of the fusion draw apparatus 101, the drawing device 140 can comprise a forming vessel 143 provided with an inlet 141 to receive glass melt from the downcomer 139.

As shown, the melting vessel 105, fining vessel 127, the mixing vessel 131, delivery vessel 133, and forming vessel 143 are examples of glass melt stations that may be located in series along the fusion draw apparatus 101.

The melting vessel 105 is typically made from a refractory material, such as refractory (e.g. ceramic) brick. The fusion draw apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming vessel 143 is also made from a refractory material and is designed to form the glass ribbon 103.

Figure 2:
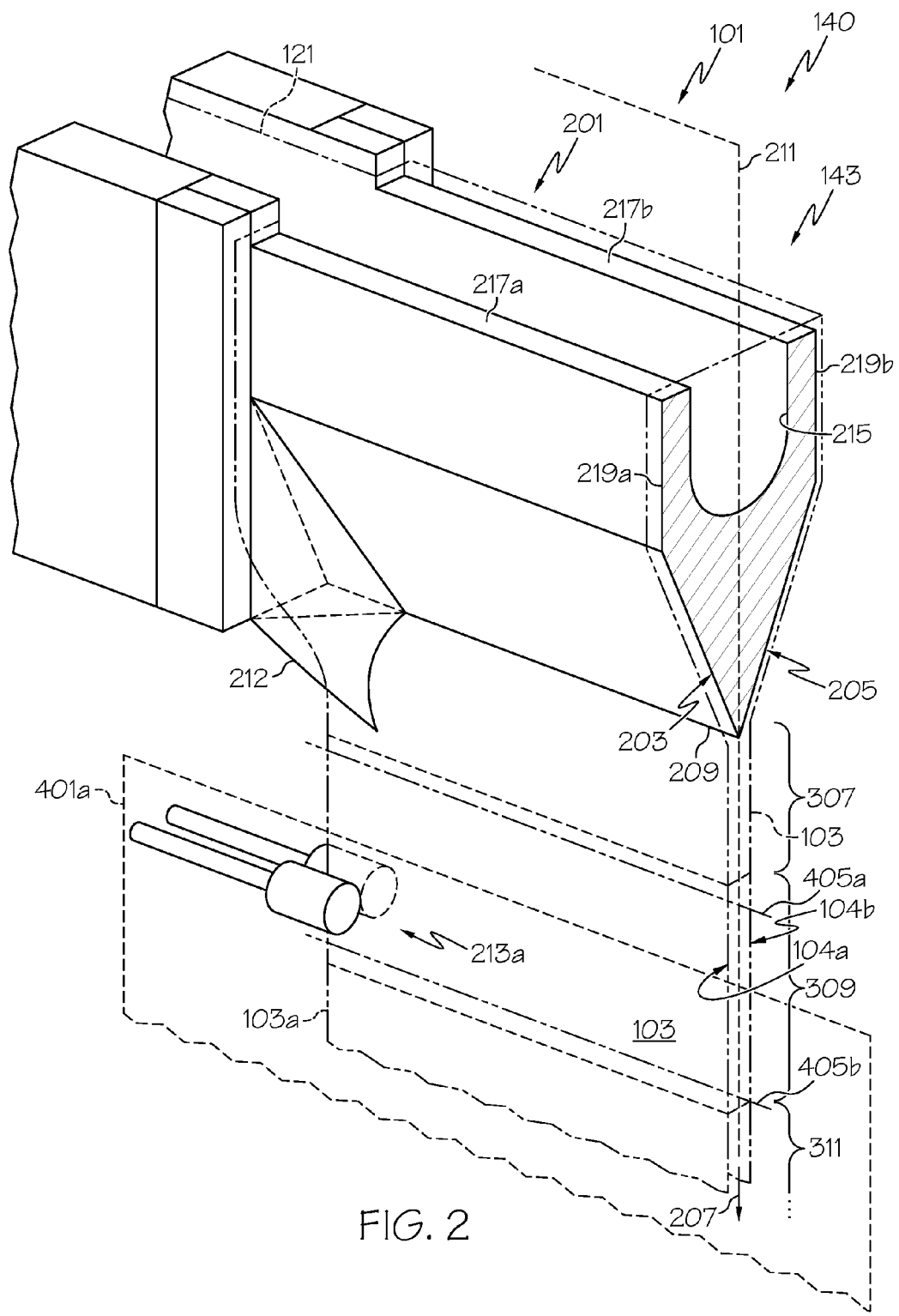
FIG. 2 illustrates a sectional view of a drawing device of the apparatus of FIG. 1.

FIG. 2 is a cross-sectional perspective view of the example fusion draw apparatus 101 along line 2-2 of FIG. 1. As shown, the forming vessel 143 includes a forming wedge 201 comprising a pair of downwardly inclined forming surface portions 203, 205 extending between opposed ends of the forming wedge 201. The pair of downwardly inclined forming surface portions 203, 205 converge along a draw direction 207 to form a root 209. A draw plane 211 of the apparatus 101 extends through the root 209 wherein the glass ribbon 103 may be drawn in the draw direction 207 along the draw plane 211 of the apparatus 101. As shown, the draw plane 211 of the apparatus 101 can bisect the root 209 although the draw plane 211 of the apparatus 101 may extend at other orientations with respect to the root 209.

Figure 3:
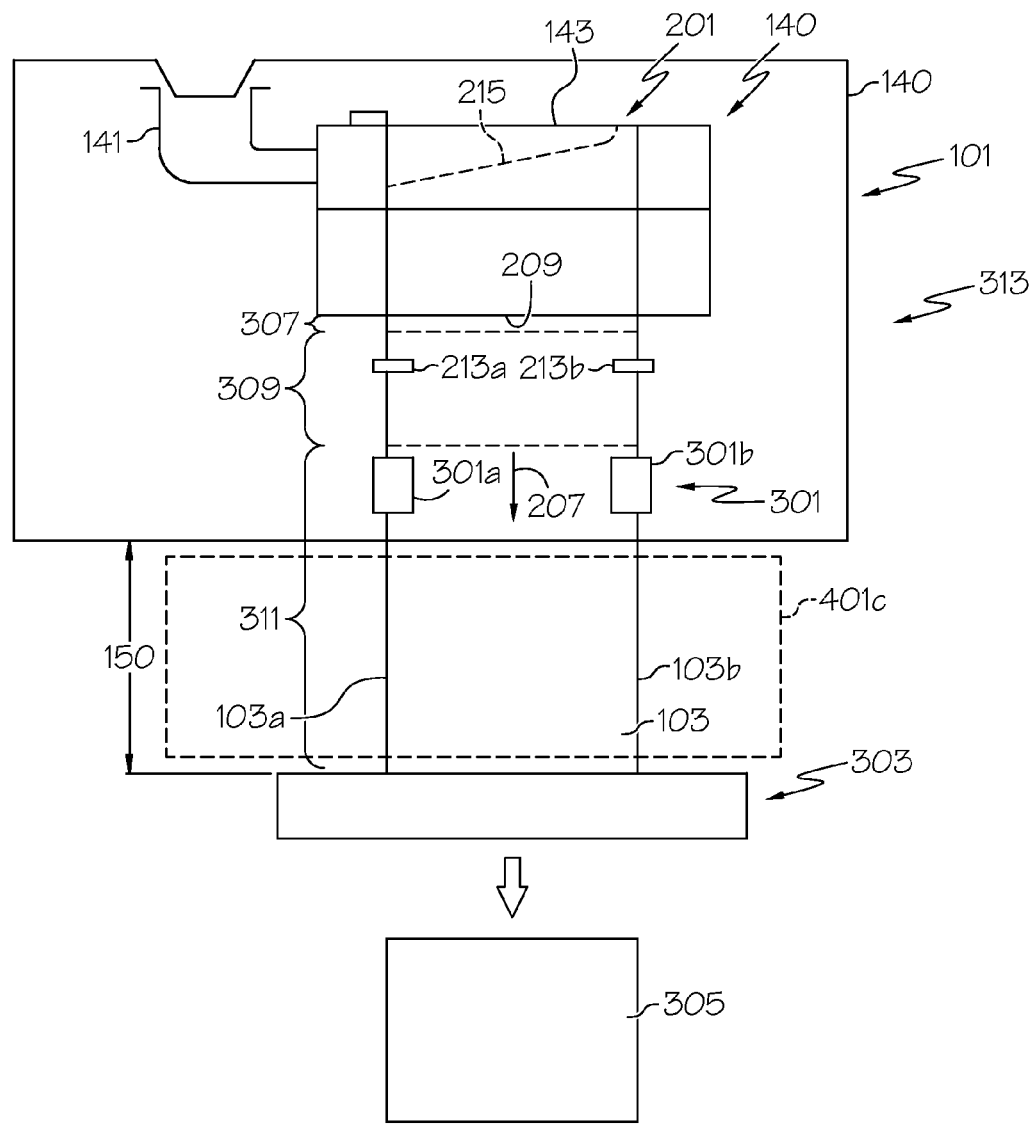
FIG. 3 schematically illustrates a glass ribbon being drawn off a forming wedge of the example drawing device of FIG. 1.

The fusion draw apparatus 101 for fusion drawing a glass ribbon can also include at least one edge roller assembly including a pair of edge rollers configured to engage a corresponding edge 103a, 103b of the glass ribbon 103 as the ribbon is drawn off the root 209 of the forming wedge 201. The pair of edge rollers facilitates proper finishing of the edges of the glass ribbon. Edge roller finishing provides desired edge characteristics and proper fusion of the edge portions of the molten glass being pulled off opposed surfaces of an edge director 212 associated with the pair of downwardly inclined forming surface portions 203, 205. As shown in FIG. 2, a first edge roller assembly 213a is associated with the first edge 103a. FIG. 3 shows a second edge roller assembly 213b associated with the second edge 103b of the glass ribbon 103. Each edge roller assembly 213a, 213b can be substantially identical to one another although the pairs of edge rollers may have different characteristics in further examples.

As shown in FIG. 3, the fusion draw apparatus 101 can further include a first and second pull roll assembly 301a, 301b for each respective edge 103a, 103b to facilitate pulling of the glass ribbon 103 in the draw direction 207 along the draw plane 211 of the apparatus 101.

The fusion draw apparatus 101 can further include a cutting device 303 that allows the glass ribbon 103 to be cut into distinct glass sheets 305. The glass sheets 305 may be subdivided into individual glass sheets for incorporating in the various display devices, such as liquid crystal displays (LCDs), electrophoretic displays (EPD), organic light emitting diode displays (OLEDs), and plasma display panels (PDPs). Cutting devices may include laser devices, mechanical scoring devices, traveling anvil machines and/or other devices configured to cut the glass ribbon 103 into the distinct glass sheets 305.

Referring to FIG. 2, in one example, the glass melt 121 can flow into a trough 215 of the forming vessel 143. The glass melt 121 can then simultaneously flow over corresponding weirs 217a, 217b and downward over the outer surfaces 219a, 219b of the corresponding weirs 217a, 217b. Respective streams of glass melt then converge along the downwardly inclined forming surface portions 203, 205 to the root 209 of the forming vessel 143. A glass ribbon 103 is then drawn off the root 209 in the draw plane 211 along draw direction 207.

Turning to FIG. 3, the glass ribbon 103 is drawn from the root 209 in the draw direction 207 from a viscous zone 307 to a setting zone 309. In the setting zone 309, the glass ribbon 103 is set from a viscous state to an elastic state with the desired cross-sectional profile. The glass ribbon is then drawn from the setting zone 309 to an elastic zone 311. In the elastic zone 311, the profile of the glass ribbon from the viscous zone 307 is frozen as a characteristic of the glass ribbon. While the set ribbon may be flexed away from this configuration, internal stresses can cause the glass ribbon to bias back to the original set profile.

As shown in FIG. 3, the fusion draw apparatus 101 can comprise a fusion draw machine 313 provided with each edge roller assembly 213a, 213b and the first and second pull roll assembly 301a, 301b. The glass ribbon can further be drawn below the fusion draw machine 313 by a distance 150 before being cut into the individual sheets 305.

Figure 4:
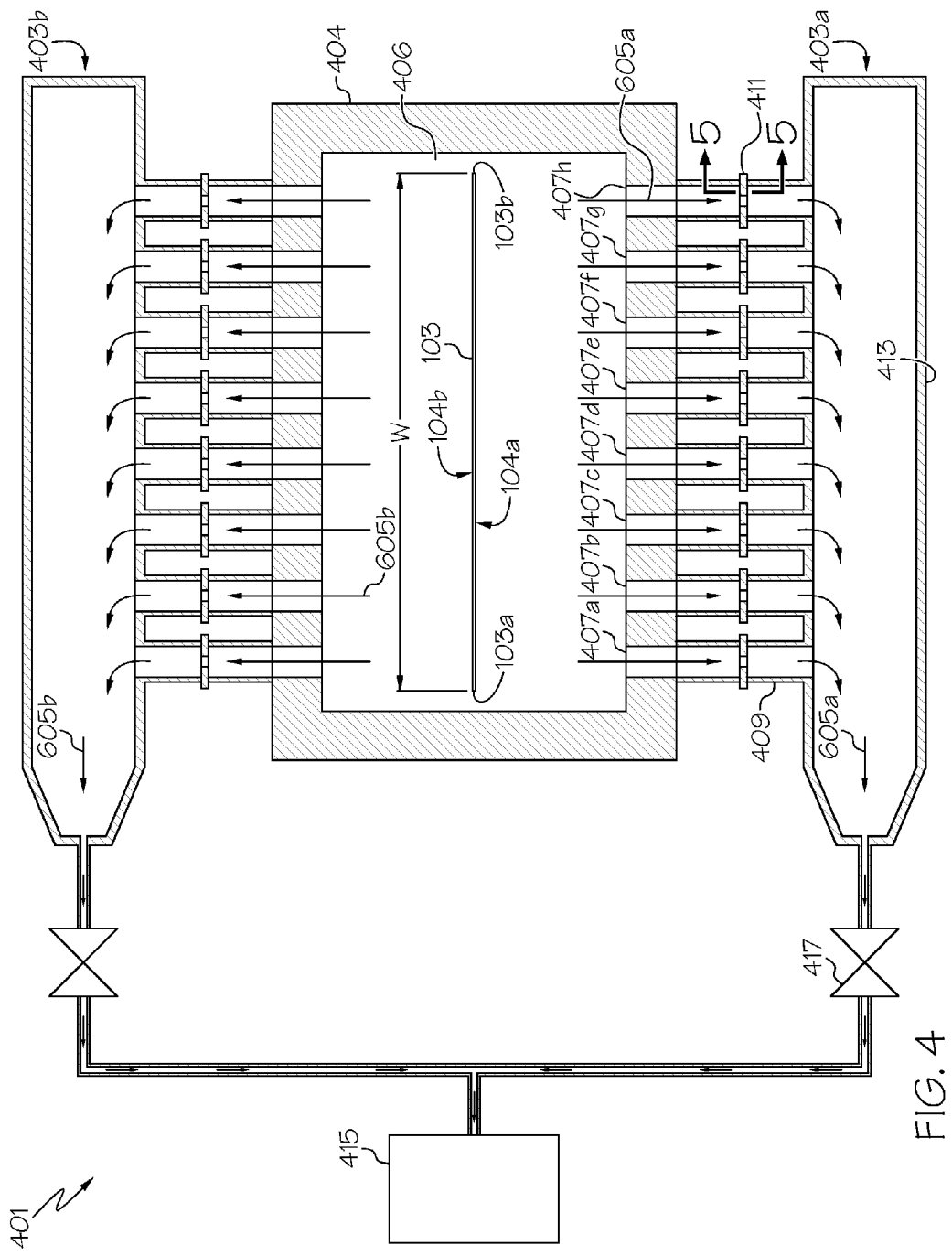
FIG. 4 illustrates a sectional view of an example convection cooling device along line 4-4 of FIG. 1.

Any of the apparatus for producing glass ribbon can include a convection cooling device 401, schematically illustrated in FIG. 4, configured to promote convection cooling of the glass ribbon by forcing a cooling fluid (e.g., vapor, gas such as air, etc.) to flow along the glass ribbon 103. The convection cooling device can be positioned to cool the glass ribbon 103 by way of convection in the setting zone 309 and/or the elastic zone 311. For example, as shown schematically by dashed lines 401a in FIGS. 1 and 2, the convection cooling device 401 can be positioned to cool the glass ribbon within the setting zone 309 and the elastic zone 311. Alternatively, as schematically shown by dashed lines 401b in FIG. 1, the convection cooling device 401 can be positioned to cool the glass ribbon only within the elastic zone 311. For example, as schematically shown by dashed lines 401c in FIG. 3, the convection cooling device 401 can be positioned to cool the glass ribbon only within the elastic zone 311 and entirely below the fusion draw machine 313 although the convection cooling device may be positioned partially or entirely within the fusion draw machine in further examples.

Figure 6:
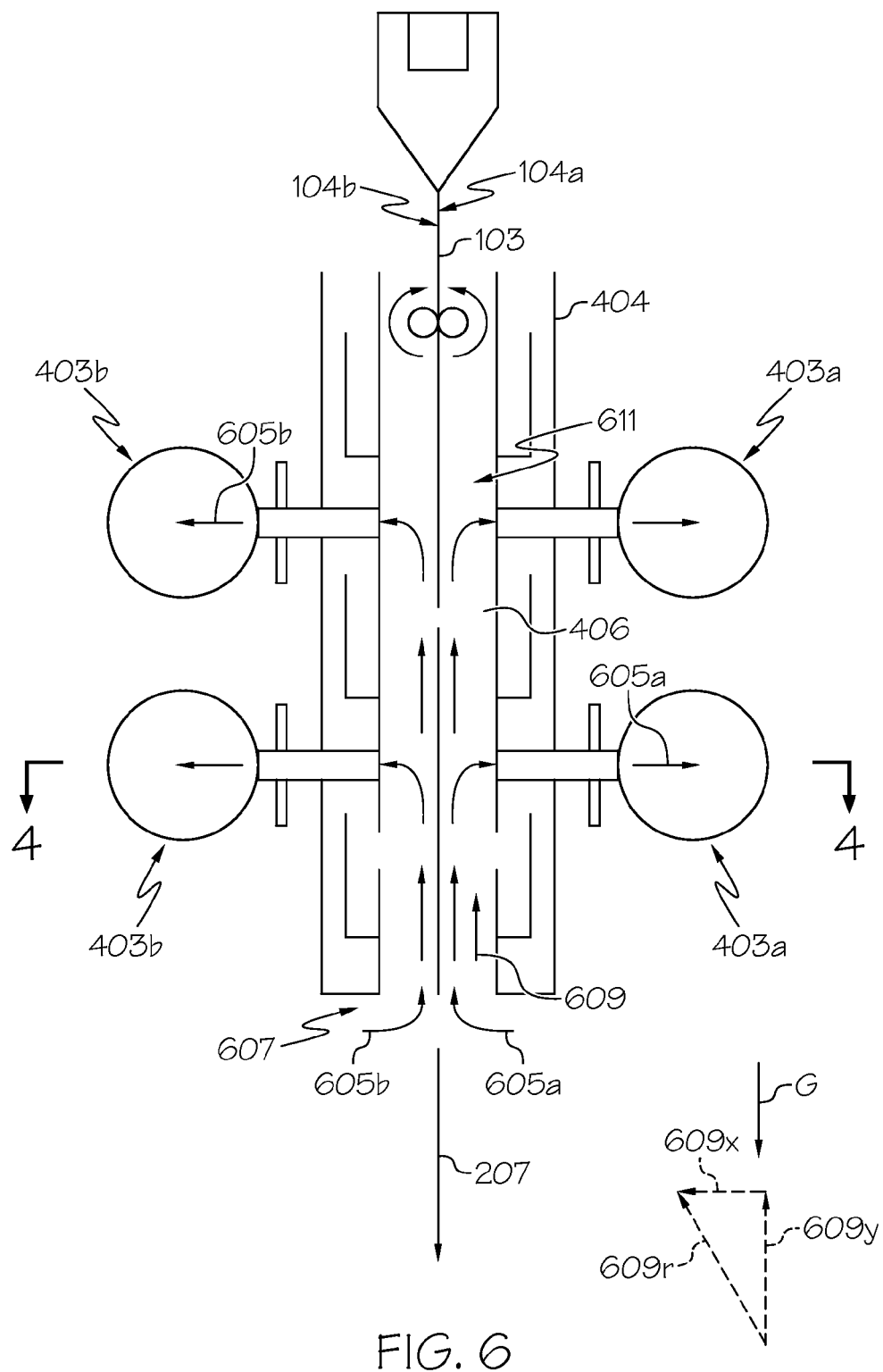
FIG. 6 illustrates an example apparatus for producing glass ribbon in accordance with aspects of the disclosure.

FIG. 4 is a schematic view of a convection cooling device 401 taken along line 4-4 of FIG. 1. As shown, the convection cooling device 401, may include at least one vacuum source configured to promote convection cooling of the glass ribbon 103 by forcing a cooling fluid to flow along the glass ribbon 103. For example, as shown in FIGS. 4 and 6, the convection cooling device 401 can optionally include a first vacuum source 403a associated with the first major surface 104a of the glass ribbon 104 and a second vacuum source 403b associated with the second major surface 104b of the glass ribbon 104. The first vacuum source 403a can be configured to promote convection cooling at the first major surface 104a of the glass ribbon 104 by forcing cooling fluid 605a to flow along the first major surface 104a. Likewise, the second vacuum source 403b can be configured to promote convection cooling at the second major surface 104b of the glass ribbon 104 by forcing cooling fluid 605b to flow along the second major surface 104b. More or less than two vacuum sources may be provided in further examples. For instance, a single or a plurality of vacuum sources may be associated with one major surface of the glass ribbon wherein the other major surface includes a different number of vacuum sources or no vacuum sources depending on the particular configuration. FIG. 6 illustrates one example, where the first major surface 104a is provided with a plurality of first vacuum sources 403a and the second major surface 104b is provided with a plurality of second vacuum sources 403b. As shown, the first vacuum sources 403a may be vertically offset from one another to promote convection cooling of the first major surface 104a. Likewise, the second vacuum sources 403b may likewise be vertically offset from one another to promote convection cooling of the second major surface 104b.

The at least one vacuum source can be configured to promote convection cooling of the glass ribbon by forcing a cooling fluid to flow along the glass ribbon 103 while contacting the glass ribbon. As such not only does the vacuum source promote convection cooling of the glass ribbon, but the vacuum source may also promote convection cooling by allowing the cooling fluid to directly contact the glass ribbon. For instance, as shown in FIG. 6, the first vacuum source(s) 403a can promote convection cooling of the glass ribbon 103 by forcing a cooling fluid 605a to directly contact the first major surface 104a as the cooling fluid 605a travels upwardly to the corresponding vacuum ports of the first vacuum source(s) 403a. Likewise, the second vacuum source(s) 403b can promote convection cooling of the glass ribbon 103 by forcing a cooling fluid 605b to directly contact the second major surface 104b as the cooling fluid 605a travels upwardly to the corresponding vacuum ports of the second vacuum source(s) 403b.

FIG. 4 shows details of the two vacuum sources 403a, 403b discussed above, wherein one vacuum source is associated with each of the major surfaces 104a, 104b of the glass ribbon 104. A shroud 404 can be provided that at least partially circumscribes the outer periphery of a length of the glass ribbon 103. For instance, as shown in FIG. 4, the shroud 404 may entirely circumscribe the outer periphery of a length of the glass ribbon 103 to define an interior convection area 406 with the glass ribbon 103 extending through the interior convection area 406. Air within the interior convection area 406 may be heated by the glass ribbon 103 such that the shroud 404 provides a chimney effect wherein an upward draft of relatively buoyant heated air flows through the interior convection area 406 in a direction opposite the direction of gravity. As such, the upward draft of heated air can consequently cause some convection cooling of the glass ribbon 103 within the shroud 404 by action of the relatively buoyant air traveling upwardly within the interior convection area 406. The convection cooling device 401 can further promote convection cooling by causing enhanced convection cooling above and beyond what is realized by the chimney effect discussed above. Indeed, the convection cooling device 401 enhances the convection action of the air within the interior convection area 406 by further forcing a cooling fluid to flow along the glass ribbon to promote additional convection cooling. The convection cooling device 401 can therefore promote convection cooling with the vacuum source by using the vacuum source to increase the convection cooling effect beyond that which would otherwise be achieved by the upward draft of heated buoyant air within the interior convection area. Alternatively, the convection cooling device may work against a chimney effect in further examples. For instance, although not shown, the convection cooling device may be designed to force cooling fluid through the interior convection area 406 to overcome an existing air flow or promote an air flow from a stationary body of air within the interior convection area 406.

As discussed above, the shroud 404 may be beneficial to facilitate a chimney effect, as described above, to achieve some convection cooling. The shroud 404 can also be beneficial to provide a controlled environment such as pressure, airflow and/or temperature and can also reduce the size of the vacuum source that would be necessary to promote a desired flow along the glass ribbon. The shroud 404 can also be provided at a desired length to help control the effective length of the convection cooling zone and location of the cooling zone with respect to the setting zone 309 and/or the elastic zone 311 as discussed above.

Although not required in all examples, as shown in FIG. 6, the cooling fluid 605a, 605b can flow along the glass ribbon 103 in a direction that is substantially opposite to the draw direction 207. Providing cooling fluid flow in an opposite direction to the draw direction can provide increased relative velocity between the cooling fluid flow and the movement of the glass along the draw direction. Consequently, an increased efficiency of cooling with the convection cooling device 401 can be achieved by flowing the fluid in the opposite direction as discussed above.

As mentioned previously the vacuum source can be used to force the cooling fluid to flow along the glass ribbon. Providing a vacuum, produces a negative pressure drop that will draw the fluid through in the direction along the glass ribbon. Using a vacuum to provide a negative pressure drop can be beneficial to avoid aggressive contact of air jets against the glass ribbon that may otherwise be experienced if attempting to force the cooling fluid into the interior convection area by way of a positive pressure drop created by air jets or other positive pressure sources. Rather, the vacuum source can be provided at the end of the fluid flow path, wherein new air can be gradually drawn into the interior convection area without aggressively impacting the glass ribbon. As such, the vacuum source can avoid temperature gradients and consequential glass imperfections that may otherwise be imposed by a positive pressure source.

The first vacuum source 403a will now be described with the understanding that the second vacuum source 403b, if provided, may be substantially identical to the first vacuum source 403a. Indeed, in one example, as shown in FIG. 4, the second vacuum source 403b may be identical to the first vacuum source 403a and appear as a mirror image of the first vacuum source about the glass ribbon 103 as shown in FIG. 4.

The vacuum source 403a, 403b can include a plurality of vacuum ports 407a-h that are disposed along a lateral portion of the glass ribbon as shown in FIG. 4. Although eight vacuum ports are illustrated, more or less vacuum ports may be provided in further examples. The vacuum ports can comprise various shapes and sizes. For example, the illustrated vacuum ports comprise substantially circular vacuum ports although elliptical, rectangular or other shaped vacuum port may be provided in further examples. The vacuum ports may comprise various configurations such as an aperture through the wall of the shroud 404. As further illustrated, one or more of the vacuum ports may also optionally comprise a fluid conduit. For example, as shown in FIG. 4, each vacuum port 407a-h may optionally be provided with a corresponding port conduit 409 configured to draw cooling fluid from the interior convection area 406.

Moreover, in one example, a single vacuum port may be provided, for example, as a single vacuum slot extending along the width "W" of the glass ribbon 104. The single vacuum slot, if provided, may extend less than the entire width "W" of the glass ribbon, the extent of which can determine the cooling profile across the width of the glass ribbon. Providing the vacuum slot extending across the entire width of the glass ribbon can facilitate maintenance of a desired cooling profile across the entire width "W" of the glass ribbon. Likewise, as shown in FIG. 4, the plurality of vacuum ports 407a-h may be disposed along a lateral portion of the glass ribbon 103 can facilitate adjustment of the cooling profile across the width "W" of the glass ribbon. For instance, as shown, the vacuum ports 407a-h can be spaced across a lateral portion of the glass ribbon 103 along the width "W", such as across the entire width "W", of the glass ribbon 103. Spacing the vacuum ports 407a-h across the later portion of the glass ribbon can facilitate maintenance of the cooling profile across a portion or the entire width of the glass ribbon. As shown, the vacuum ports 407a-h are equally spaced apart although the vacuum ports may be unevenly spaced apart in further examples.

Figure 5:
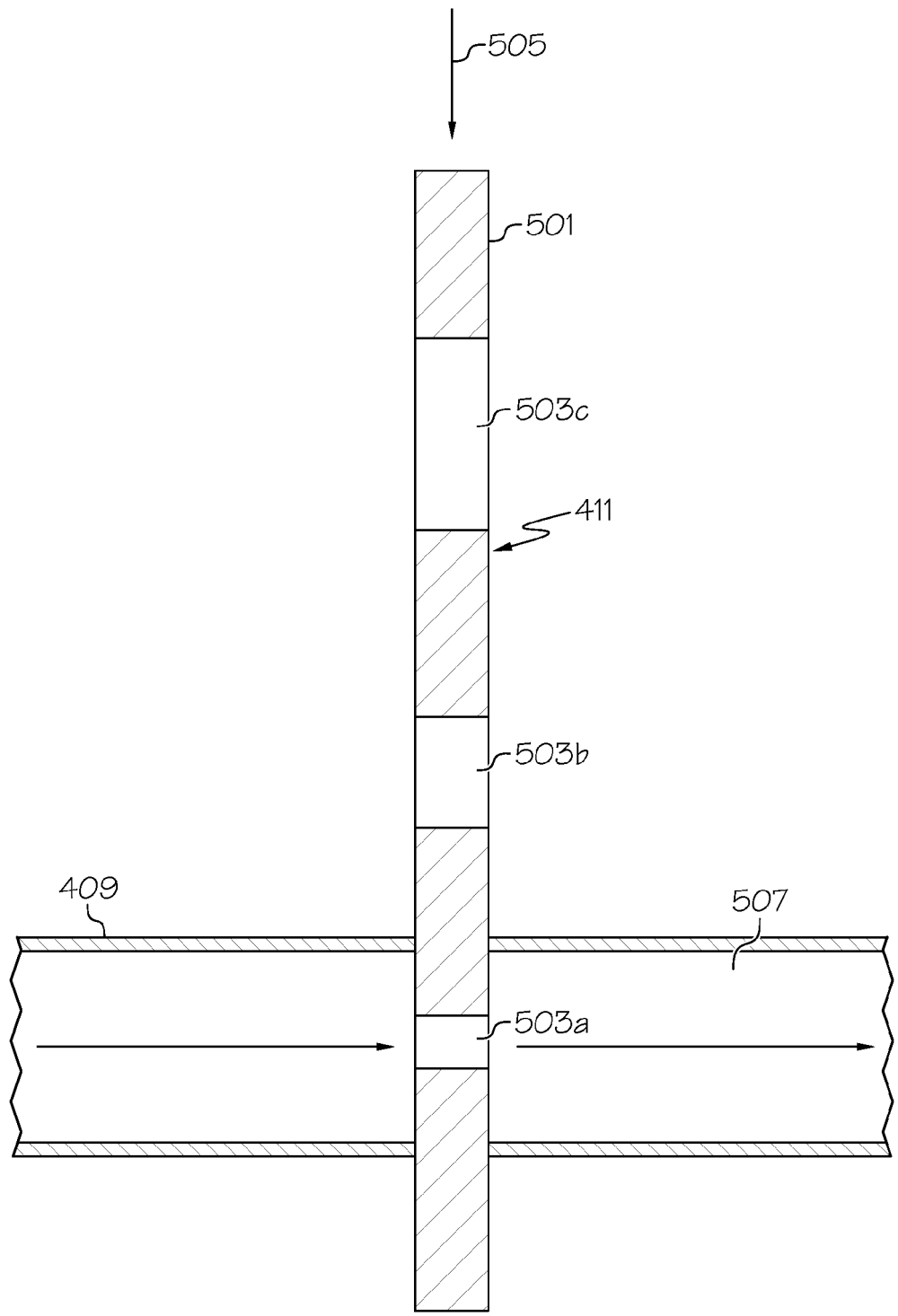
FIG. 5 is a cross sectional view along line 5-5 of FIG. 4, illustrating example features of the convection cooling device of FIG. 4.

At least one vacuum port can be adjustable to control fluid flow through the vacuum port. For instance, all of the illustrated vacuum ports 407a-h may be adjustable or only a single or subset of vacuum ports may be adjustable in further examples. In some examples, each adjustable vacuum port may be provided with its own adjustable control device or a plurality, such as all, of the ports may share an adjustable control device to allow flow together. Providing each vacuum port with its own adjustable control device may permit configuration to allow the vacuum ports to be adjusted independent from one another. Various configurations may be provided for the adjustable control device. For example, the adjustment control device may comprise an independent vacuum source, wherein each vacuum port includes a unique vacuum source that may be independently operated to adjust the corresponding flow of cooling fluid therethrough. In an alternative example, a valve arrangement may be provided to facilitate adjustment. For instance, the valve may comprise a shutter configured to be adjusted to provide a desired flow opening corresponding to the desired cooling fluid flow. In further examples, as shown, the adjustment control device can comprise a shutter valve 411. As shown in FIG. 5, the shutter valve 411, if provided, may include a valve plate 501 that may be translated along direction 505 (or the opposite direction) to align one of the alternatively sized openings 503*a-c* with an interior area 507 of the port conduit 409. As schematically shown, the smallest opening 503*a* is aligned with the interior area 507 to provide a reduced cooling fluid flow rate. Alternatively, the valve plate 501 may be shifted in direction 505 relative to the port conduit 409 such that the intermediate sized opening 503*b* is aligned with the interior area 507 to provide an intermediate cooling fluid flow rate. Still further, the valve plate 501 may be further shifted in direction 505 relative to the port conduit 409 to align the large sized opening 503*c* with the interior area 507 to provide a relatively high fluid flow rate. In further examples, the valve plate 501 may be adjusted so none of the openings 503*a-c* are aligned with the interior area 507 to prevent cooling fluid from flowing through the port conduit 409.

Although three alternative discrete fluid flow options are shown, only two or more than three discrete fluid flow options may be provided in further examples. Alternatively, the fluid flow option may be infinitely adjustable between a minimum and maximum fluid flow. For instance, a single opening may be provided that flared at one end and/or tapered at the other end such that movement of the plate along the direction continuously changes the effective flow area that is aligned with the interior area to continuously adjust the flow rate of the cooling fluid.

The adjustment control device may be operated manually. In such situations, the adjustment control device may optionally be located outside of the shroud 404 to reduce exposure to heat while manually adjusting the adjustment control device. Alternatively, the adjustment control devices may be configured for automatic adjustment. For instance, temperature sensors may be located along a transverse portion of the glass ribbon in the direction of the width to obtain a temperature profile of the glass ribbon. This information may be received by a controller configured to input the temperature values into one or more algorithms programmed into the controller to automatically adjust the adjustment control devices to achieve the desired transverse temperature profile.

Turning back to FIG. 4, the convection cooling device is configured to operate the first vacuum source 403*a* independently from the second vacuum source 403*b*. For example, each vacuum source 403*a*, 403*b* may optionally be provided with a corresponding vacuum conduit 413 in fluid communication with the plurality of vacuum ports 407*a-h*. At least one vacuum device 415, such as a negative pressure chamber, pump (e.g., blower) or the like may be provided to generate a negative pressure to be applied to the plurality of vacuum ports 407*a-h*. Each vacuum conduit 413 may be provided with an independent vacuum device 415. Alternatively, as shown, a single vacuum device 415 may be operated to generate the negative pressure that may be applied to the vacuum conduit 413 of each vacuum source 403*a*, 403*b*. One or more optional valves 417 may be provided to help regulate application of the negative pressure and/or proportion the negative pressure between the vacuum conduits 413 of the respective vacuum sources 403*a*, 403*b*.

Methods of producing the glass ribbon 103 will now be described with initial reference to FIG. 1. As shown, the method can include the step of drawing the glass ribbon 103 along the draw direction 207 into the viscous zone 307. In some examples, the glass ribbon 103 is fusion drawn from the root 209 of the forming wedge 201 into the viscous zone 307 wherein the glass ribbon 103 includes opposed edges 103*a*, 103*b* and a lateral portion extending between the opposed edges along a lateral direction 142 transverse to the draw direction 207. The method can further include the step of drawing the glass ribbon into the setting zone 309 downstream from the viscous zone 307, wherein the glass ribbon 103 is set from a viscous state to an elastic state. The method can further include the step of drawing the glass ribbon into the elastic zone 311 downstream from the setting zone 309. The method also includes the step of creating a vacuum to promote convection cooling of the glass ribbon 103 by forcing a cooling fluid to flow along the glass ribbon 103. In some examples, the cooling fluid can comprise gas, such as air, vapor or other gas.

The method can include contacting the glass ribbon 103 with the cooling fluid. For example, as shown in FIG. 6, the vacuum sources 403*a*, 403*b* can cause air to be drawn into a lower portion 607 of a cooling zone such that the first cooling fluid 605*a* contacts the first major surface 104*a* of the glass ribbon 103 and the second cooling fluid 605*b* contacts the second major surface 104*b* of the glass ribbon 103.

As further shown in FIG. 6, the method can force the cooling fluid 605*a*, 605*b* to flow in a cooling flow direction 609 opposite to the draw direction 207 to enhance heat transfer by way of convection. Indeed, the glass ribbon 103 is drawn downward along direction 207. Meanwhile, the air can be drawn into the lower portion 607 of the cooling zone and travel along the cooling flow direction 609 from the lower portion 607 of the cooling zone to the upper portion 611 of the cooling zone. In addition or alternatively, some examples can force the cooling fluid to flow in a flow direction that has a vector component that is opposite to the direction of gravity. For instance, as shown in FIG. 6, the draw direction 207 may be identical to the gravitational direction "G" but the draw direction 207 may be at an angle relative to the draw direction in further examples. With respect to gravity, the directional vector component 609*y* of the representative cooling flow direction 609*r* can be opposite to the direction of gravity "G" even in examples where the flow direction 609 is not entirely opposite to the direction of gravity "G" as shown by flow direction 609 in FIG. 6. In some examples, the vector component 609*x* may be zero, wherein the entire cooling fluid flows in the flow direction that 609*y* that is opposite to the direction of gravity. Such examples can further provide cross-flow convection cooling with a portion of the fluid flowing in an opposite direction than the draw direction in a down draw process.

In some examples, the method can optionally provide the first vacuum source 403*a* associated with the first major surface 104*a* of the glass ribbon 103 and the second vacuum surface 104*b* associated with the second major surface 104*b* of the glass ribbon 103. The first vacuum source 403*a* may be operated independently from the second vacuum source 403*b*. As such, the first major surface 104*a* may be exposed to a greater convection cooling environment than the second major surface 104*b*.

In further examples, the method can include adjusting the cooling profile along the lateral portion of the glass ribbon 103 with the plurality of vacuum ports 407a-h. As such, a lateral cooling profile along the width "W" of the glass ribbon 103 may be provided along the lateral portion of the glass ribbon 103 to provide desired cooling characteristics based on the cooling profile.

Examples of the present disclosure can promote substantial convection cooling in any of the viscous zone 307, setting zone 309 and/or elastic zone 311. In some examples, as represented by the dashed lines 401a in FIG. 1, the convection cooling device 401 may be configured for substantial convection cooling in the elastic zone and the setting zone. Alternatively, as represented by dashed lines 401b in FIGS. 1 and 2 and by dashed lines 401c in FIG. 3, the convection cooling device 401 can only promote substantial convection cooling in the elastic zone 311.

The present disclosure provides convection cooling that can be relatively more effective than radiation cooling at locations downstream, such as within the setting zone 309 and/or the elastic zone 311 and/or with glass that is being drawn at lower temperatures. As such, the present disclosure applies convection heat transfer to provide adequate removal of heat from a glass ribbon that is at a relatively lower temperature. As discussed above, convection heat transfer can be achieved by applying a vacuum source to draw cooling fluid (e.g., ambient air from outside the apparatus 101) to pass along the glass ribbon to cause convective heat transfer from the glass ribbon by way of the movement of cooling fluid along the glass ribbon.

It will be apparent to those skilled in the art that various modifications and variations can be made to the described embodiments without departing from the spirit and scope of the claimed invention. Thus, it is intended that the present claimed invention cover the modifications and variations of the embodiments described herein provided they come within the scope of the appended claims and their equivalents.

What is claimed is:

1. A method of producing a glass ribbon including the steps of:
   (I) drawing a glass ribbon along a draw direction into a viscous zone, wherein the glass ribbon includes opposed edges and a lateral portion extending between the opposed edges along a lateral direction transverse to the draw direction;
   (II) drawing the glass ribbon into a setting zone downstream from the viscous zone, wherein the glass ribbon is set from a viscous state to an elastic state;
   (III) drawing the glass ribbon into an elastic zone downstream from the setting zone;
   (IV) creating a vacuum to promote convection cooling of the glass ribbon by forcing a cooling fluid to flow along the glass ribbon and contact the glass ribbon, wherein the vacuum is created with a plurality of vacuum ports including a first set of vacuum ports facing a first major surface of the glass ribbon, the first set of vacuum ports including an unobstructed view of the first major surface and spaced apart along the lateral direction of the lateral portion of the glass ribbon, and a second set of vacuum ports facing a second major surface of the glass ribbon, the second set of vacuum ports including an unobstructed view of the second major surface and spaced apart along the lateral direction of the lateral portion of the glass ribbon; and
   (V) independently adjusting fluid flow through at least one vacuum port of the plurality of vacuum ports to control a cooling profile of the cooling fluid along the lateral portion of the glass ribbon.

2. The method of claim 1, wherein the vacuum of step (IV) forces the cooling fluid to flow in a flow direction that is substantially opposite to the draw direction.

3. The method of claim 1, wherein the vacuum of step (IV) forces the cooling fluid to flow in a flow direction that has a vector component that is opposite to the direction of gravity.

4. The method of claim 1, wherein step (IV) operates a first vacuum source to draw cooling fluid through the first set of vacuum ports and operates a second vacuum source to draw cooling fluid through the second set of vacuum ports, wherein the first vacuum source is operated independently from the second vacuum source.

5. The method of claim 1, wherein step (IV) only promotes convection cooling in the elastic zone.

6. The method of claim 1, wherein step (IV) only promotes convection cooling in the elastic zone and the setting zone.

7. The method of claim 1, wherein step (I) comprises fusion drawing the glass ribbon from a root of a forming wedge into the viscous zone.

8. The method of claim 1, wherein step (V) includes independently adjusting an adjustable flow control device to adjust the fluid flow through the at least one vacuum port.

9. The method of claim 8, wherein step (IV) operates a first vacuum source to draw cooling fluid through the first set of vacuum ports and operates a second vacuum source to draw cooling fluid through the second set of vacuum ports, wherein the first vacuum source is operated independently from the second vacuum source.

10. An apparatus for producing a glass ribbon comprising:
    a drawing device configured to draw molten glass into a glass ribbon in a draw direction along a draw plane of the apparatus; and
    a convection cooling device including at least one vacuum source configured to promote convection cooling of the glass ribbon by forcing a cooling fluid to flow along and contact the glass ribbon, the convection cooling device including a plurality of vacuum ports including a first set of vacuum ports for facing a first major surface of the glass ribbon, the first set of vacuum ports configured for an unobstructed view of the first major surface of the glass ribbon and spaced apart along a lateral direction transverse to the draw direction, and a second set of vacuum ports for facing a second major surface of the glass ribbon, the second set of vacuum ports configured for an unobstructed view of the second major surface of the glass ribbon and spaced apart along the lateral direction, wherein at least one vacuum port of the plurality of vacuum ports includes an adjustable flow control device to independently adjust fluid flow through the at least one vacuum port and control a cooling profile of the cooling fluid along the lateral direction.

11. The apparatus of claim 10, wherein the convection cooling device is configured to force the cooling fluid to flow in a flow direction that is substantially opposite to the draw direction.

12. The apparatus of claim 10, wherein the at least one vacuum source comprises a first vacuum source to draw cooling fluid through the first set of vacuum ports and a second vacuum source to draw cooling fluid through the second set of vacuum ports, wherein the convection cooling device is configured to operate the first vacuum source independently from the second vacuum source.

13. The apparatus of claim 10, wherein each of the plurality of vacuum ports includes an adjustable flow control device to independently adjust fluid flow through each of the corresponding vacuum ports.

14. The apparatus of claim 13, wherein the at least one vacuum source comprises a first vacuum source to draw cooling fluid through the first set of vacuum ports and a second vacuum source to draw cooling fluid through the second set of vacuum ports, wherein the convection cooling device is configured to operate the first vacuum source independently from the second vacuum source.

15. The apparatus of claim 10, wherein the drawing device is configured to draw the molten glass from a viscous zone into a setting zone downstream from the viscous zone, wherein the glass ribbon is set from a viscous state to an elastic state, and then from the setting zone to an elastic zone downstream from the setting zone, wherein the convection cooling device includes at least one vacuum port positioned downstream from the viscous zone.

16. The apparatus of claim 10, wherein the drawing device includes a forming wedge with a root, wherein the drawing device is configured to draw a glass ribbon off the root of the forming wedge.

* * * * *